(12) United States Patent
Huq et al.

(10) Patent No.: US 12,511,828 B1
(45) Date of Patent: Dec. 30, 2025

(54) SCANNING OF INTERACTABLE OBJECTS OF VIRTUAL WORLDS

(71) Applicant: Trend Micro Incorporated, Taipei (TW)

(72) Inventors: Numaan Huq, Toronto (CA); Philippe Lin, Taipei (TW); Roel Reyes, Metro Manila (PH); Josiah Hagen, Irving, TX (US); Morton Swimmer, Wedel (DE)

(73) Assignee: Trend Micro Incorporated, Tokyo (JP)

( * ) Notice: Subject to any disclaimer, the term of this patent is extended or adjusted under 35 U.S.C. 154(b) by 171 days.

(21) Appl. No.: 18/513,127

(22) Filed: Nov. 17, 2023

(51) Int. Cl.
*G06T 17/00* (2006.01)

(52) U.S. Cl.
CPC .................................. *G06T 17/00* (2013.01)

(58) Field of Classification Search
CPC ........................................................ G06T 17/00
See application file for complete search history.

(56) References Cited

U.S. PATENT DOCUMENTS

| | | | | |
|---|---|---|---|---|
| 2019/0094955 | A1* | 3/2019 | Zuber | G06F 3/04815 |
| 2019/0165941 | A1* | 5/2019 | Ray | H04L 9/006 |
| 2019/0303908 | A1* | 10/2019 | Sokolov | G06F 21/552 |
| 2019/0362076 | A1* | 11/2019 | Wang | G06Q 30/0207 |
| 2022/0239648 | A1* | 7/2022 | Ramachandran | G06F 21/316 |
| 2023/0035360 | A1* | 2/2023 | Holland | G06V 10/758 |
| 2024/0035869 | A1* | 2/2024 | Shamrock | G01F 15/068 |
| 2024/0282130 | A1* | 8/2024 | Green | G06T 11/60 |
| 2024/0297895 | A1* | 9/2024 | Cho | H04L 63/029 |

OTHER PUBLICATIONS

"A Hyperspatial Language", Spatial Web Foundation, Downloaded Aug. 14, 2023, https://spatialwebfoundation.org/protocols/contracts/.
"The Spatial Web and Web 3.0" Deloitte Insights, Downloaded August 14, 2023, https://www2.deloitte.com/content/dam/insights/us/articles/6645_Spatial-web-strategy/DI_Spatial-web-strategy.pdf.
"Smart Object", Wikipedia, Downloaded Sep. 27, 2023, https://en.wikipedia.org/wiki/Smart_object.
Peter H. Diamandis, "The Spatial Web—Part 1", Nov. 11, 2018, https://www.diamandis.com/blog/the-spatial-web-part-1.
Peter H. Diamandis, "The Spatial Web—Part 2", Nov. 18, 2018, https://www.diamandis.com/blog/the-spatial-web-part-2.
Peter H. Diamandis, "The Spatial Web Will Map Our 3D World—And Change Everything in the Process", Nov. 16, 2018, https://singularityhub.com/2018/11/16/the-spatial-web-will-map-our-3d-world-and-change-everything-about-it-in-the-process/.

* cited by examiner

*Primary Examiner* — Maurice L. Mcdowell, Jr.
(74) *Attorney, Agent, or Firm* — Beyer Law Group LLP

(57) ABSTRACT

Interactable objects of a virtual world are scanned to determine if they are malicious. A spatial resource identifier (SRI) of an interactable object is received in a virtual reality (VR) interface that is employed by a user to access the virtual world. The interactable object is scanned when it has been rendered and is in range of the user. The scanning includes querying a backend system, using the SRI, for a reputation of the interactable object when the VR interface is incapable of scanning the interactable object.

9 Claims, 6 Drawing Sheets

250

```
0001  Scanner begin
0002  for sri in within_range(SRI)
0003      if not is_rendered(sri)
0004          next for
0005      for element in get_interactable_objects(sri)
0006          if VR_is_capable
0007              reputation := local_scanner(element)
0008          else
0009              reputation := backend_scanner(element)
0010          end if;
0011          if reputation < threshold
0012              block(element)
0013          else
0014              allow(element)
0015          end if;
0016      end for;
0017  end for;
0018  end.
0019
0020  get_interactable_objects begin
0021      return list of [
0022          for sub in subordinate_objects(sri)
0023              get_interactable_objects (sub)
0024          end for,
0025          interactable_objects triggered_by(sri),
0026          interactrable_objects_that_support(sri)
0027      ];
0028  end.
0029
0030  within_range begin
0031      true if sri
0032          rendered_in_viewport |
0033          displayed_in_goggle |
0034          hooked_by_another_interactable_object(distance < D) |
0035          hooked_by_periodic_functions(distance < D) |
0036          hooked_by_background_functions_in_VR_world |
0037          ... ;
0038  end.
```

FIG. 3

SCANNING OF INTERACTABLE OBJECTS OF VIRTUAL WORLDS

TECHNICAL FIELD

The present disclosure is directed to cybersecurity.

BACKGROUND

A virtual world has interactable objects that can be manipulated by users that are logged in the virtual world. An interactable object may be an integral part of the virtual world, created by a user in the virtual world, or brought by a user from another virtual world. An interactable object that is owned by a user is a digital asset of the user. Examples of virtual worlds include those provided by Decentraland, The Sandbox, Hyperfy, Substrata, Voxels (formerly known as Cryptovoxels), Somnium Space, Spatial, Matrix World, HYTOPIA, Netvrk, VRChat, Second Life, etc.

Virtual worlds may be operated by different entities. For example, a virtual world may be operated by a retail company to allow customers to virtually walk around aisles, select an item from a shelf, and experience the item before purchasing. Such virtual world may also allow customers to pay using digital currency that is accepted in the virtual world, and receive a physical version of the item by regular mail. As another example, a second virtual world may be operated by a gaming company to allow players to roam, explore, work in, etc., the virtual world. Yet another example, a third virtual world may be operated by a social networking company to allow users to meet, establish an economy, etc. in a virtual world that is a mirror of the physical world. A collection of virtual worlds is also referred to herein as a "metaverse."

A virtual world may allow a physical object to be digitized and represented as a digital twin in the virtual world. For example, a guitar may be digitized and represented as a virtual guitar that a user can play in the virtual world. As another example, an Internet of things (IoT) device, such as a smart switch, smart alarm clock, a smart radio, etc., may have a corresponding digital representation in the virtual world that the user can manipulate. An action that is taken by a user on an interactable object in the virtual world (e.g., flip a switch in the virtual world) may be linked to a corresponding physical object in the real world (e.g., activate a smart switch in the real world).

Embodiments of the present invention pertain to scanning of interactable objects of virtual worlds to determine if they are malicious.

BRIEF SUMMARY

In one embodiment, interactable objects of a virtual world are scanned to determine if they are malicious. A spatial resource identifier (SRI) of an interactable object is received in a virtual reality (VR) interface that is employed by a user to access the virtual world. The interactable object is scanned when it has been rendered and is in range of the user. The scanning includes querying a backend system, using the SRI, for a reputation of the interactable object when the VR interface is incapable of scanning the interactable object.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 shows a pseudo-code for scanning interactable objects of a virtual world, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
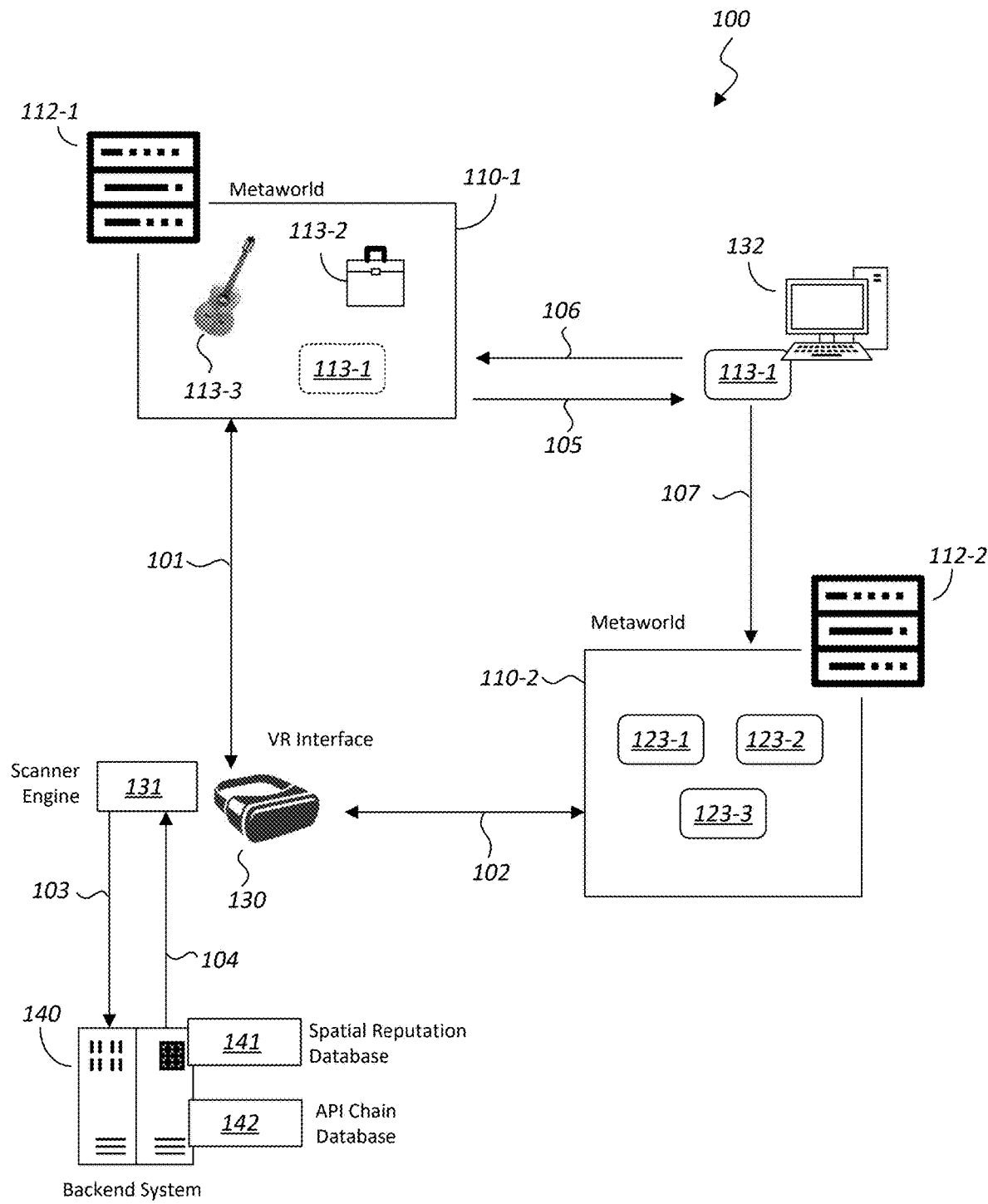
FIG. 1 shows a block diagram of a system for scanning interactable objects of a virtual world, in accordance with an embodiment of the present invention.

FIG. 1 shows a block diagram of a system for scanning interactable objects of a virtual world, in accordance with an embodiment of the present invention. In the example of FIG. 1, a system 100 comprises a virtual reality (VR) interface 130 and a backend system 140. The system 100 is configured to scan interactable objects of virtual worlds 110 (i.e., 110-1, 110-2, etc.) to determine if the interactable objects are malicious.

A virtual world 110 may be implemented on a computer system 112 (i.e., 112-1, 112-2, etc.). A computer system 112 may comprise interconnected computers, a cloud computing platform, or other computing infrastructure. The computer systems 112, the VR interface 130, and the backend system 140 may communicate over a computer network (e.g., the public Internet) in accordance with a predetermined protocol that is secure and reliable (e.g., Hypertext Transfer Protocol Secure (HTTPS)). Embodiments of the present invention are protocol-agnostic in that they are applicable to any suitable protocol.

In the example of FIG. 1, a user accesses a virtual world 110 using the VR interface 130 (see arrows 101 and 102). In one embodiment, the VR interface 130 is a VR headset/goggles. The VR interface 130 includes a screen that displays elements of the virtual world 110, such as interactable objects. A virtual world 110 renders elements that are within or may enter a field of view of the user as the user roams the virtual world 110. In one embodiment, an element is rendered when data for displaying the element on the screen of the VR interface 130 has been received in the VR interface 130. Such data may be stored in the display buffer of the VR interface 130. As can be appreciated, rendered elements are not necessarily displayed on the screen of the VR interface 130, e.g., when the interactable object is not within the field of view of the user. As a particular example, a rendered element does not have to be displayed on the display screen of the VR interface 130 when the rendered element is behind the user.

The user may interact with an interactable object by making hand gestures, utilizing a hand-held interface, wearing a smart interface (e.g., bodysuit, gloves), or by some other way that is suitable for the given virtual world. Examples of interaction with an interactable object include moving the interactable object to another location within a virtual world or to another virtual world, changing features of the interactable object, activating features of the interactable object, etc.

Generally, an interactable object is an artifact in a virtual world that users can interact with, as opposed to simply being a passive element of the virtual world. A user that is logged in the virtual world may take actions on interactable objects in that virtual world. For example, a user may play an interactable object that represents a guitar, turn on an interactable object that represents a wall switch, wear an interactable object that represents a backpack, sit on an interactable object that represents a chair, etc.

The virtual world does not necessarily have to meet real world expectations. As an example, a wall switch and a lamp that is supposed to be lit when the switch is activated may each be an interactable object. However, in the virtual world, activating the switch will not necessarily turn on the lamp. The switch may be malicious and instead empty the user's crypto wallet or download a virus while turning on the lamp. As another example, the strings, tuning pegs, etc. of a guitar may each be an interactable object. In the virtual world, activating the strings of the guitar may generate sounds, or might just turn on the lamp in the room.

An interactable object that was created or pre-populated in a virtual world is "native" to that virtual world. In the example of FIG. 1, interactable objects 113 (i.e., 113-1, 113-2, 113-3, etc.) are native to the virtual world 110-1, whereas interactable objects 123 (i.e., 123-1, 123-2, 123-3, etc.) are native to the virtual world 110-2. An interactable object has a designated spatial resource identifier (SRI) for identifying the interactable object. The SRI distinguishes the interactable object from other interactable objects. The SRI of an interactable object may be assigned upon creation in a virtual world, and may be unique to the interactable object at least in that virtual world. The SRI may be standardized between virtual worlds, e.g., by agreement between particular virtual worlds. The SRI may also be augmented by or mapped to another identifier in a virtual world in which the interactable object is non-native.

An interactable object has corresponding program code that is executed by at least one processor to perform the functionalities of the interactable object. An interactable object may thus be compromised by a cyberattack, e.g., infected with malware. An interactable object may also be brought into the virtual world by a cybercriminal for a malicious purpose. Accordingly, it is important to scan interactable objects for malware. However, the multitudes of interactable objects in a virtual world, not to mention interactable objects in the entire metaverse, pose a significant hurdle in scanning interactable objects. Also, unlike static webpages, users dynamically perceive and interact with interactable objects in a virtual world. Furthermore, some VR interfaces may not have enough computing resources to properly scan interactable objects.

A backend system 140 may comprise a computer system that supports cybersecurity operations in the VR interface 130. The backend system 140 may comprise interconnected computers, a cloud computing platform, or other computing infrastructure. The backend system 140 may communicate with the VR interface 130 over the public Internet, such as in accordance with HTTPS or other suitable communication protocol. In one embodiment, the backend system 140 includes storage space (e.g., cloud storage, network attached storage, local data storage) that stores a spatial reputation database 141 and an application programming interface (API) chain database 142. The spatial reputation database 141 indicates a reputation of a particular interactable object, such as whether the interactable object is malicious, normal, or is unknown (i.e., has an unknown reputation). The reputation of an interactable object may be determined off-line by cybersecurity experts using machine learning, data mining, malware scanning, sandboxing, or other way without detracting from the merits of the present invention. The reputation of an interactable object may also be determined from threat information provided by external sources, such as feeds from various cybersecurity vendors, cybersecurity organizations, customer feedback, etc. In one embodiment, reputations of interactable objects are identified in the spatial reputation database 141 by corresponding SRIs of the interactable objects.

Application programs ("applications") may be containerized to facilitate creation and deployment of interactable objects in and between virtual worlds. That is, an application of an interactable object may be encapsulated in a container. The containerized application may include an API pipeline, which includes an API chain. As its name indicates, an API chain is a sequence of APIs. An API chain comprises a first API that calls a second API, a third API that is called by the second API, etc. API chains may be obtained from third-party providers, i.e., vendors or developers that are not associated with the creator of the containerized application. In other words, an interactable object may comprise an application with portions provided by different entities, including API chains from different providers.

The API chain database 142 indicates a reputation score of a containerized API chain. The reputation score indicates a security risk posed by an API chain, and may be utilized to determine whether or not the API chain can be trusted. In one embodiment, the lower the reputation score, the higher the security risk posed by the API chain. The reputation score of the API chain may be compared to a predetermined threshold to determine if the API chain is malicious. An API chain is deemed malicious when its reputation score is lower than the threshold.

The VR interface 130 comprises at least one processor and a memory, with the memory storing instructions that when executed by the at least one processor cause the VR interface 130 to perform operations described herein. In the example of FIG. 1, the VR interface 130 runs instructions of a scanner engine 131. The scanner engine 131 is configured to receive features of an interactable object that may be used in the scanning of the interactable object. In one embodiment, these features of the interactable object include the SRI of the interactable object; the spatial location of the interactable object in the virtual world; other interactable objects that are subordinate to the interactable object ("subordinate interactable objects"); binary, code, functions, smart contract, etc. that are triggered by the interactable object; and binary, code, functions, smart contract, etc. that contribute to the interactable object (e.g., give the interactable object shape, value, text, etc.). Other features of the interactable object that may be received by the VR headset 130 may include data of the following:

(a) Interactivity: Interactive features that allow users to engage with the interactable object. The interactive features may include the ability to be moved, modified, or activated in some way.

(b) 3D Model: A 3D model that represents the interactable object visually within the virtual world. The 3D model could potentially be manipulated or changed by users.

(c) Metadata: Metadata of the interactable object describing its properties, history, ownership, and other relevant information.

(d) APIs: APIs exposed by the interactable object to allow it to interact with other interactable objects or systems. These APIs may include APIs for moving the interactable object, changing its properties, or triggering actions.

(e) Security Features: The interactable object may contain security features to protect against attacks. These security features may include encryption, access controls, etc.

(f) State Information: The interactable object may maintain state information, allowing it to remember its status or the outcomes of interactions with users.

(g) Physics Properties: To mimic real-world interactions, the interactable object may have physics properties, such as mass, velocity, friction, and collision responses.

(h) Ownership Rights: The interactable object may have associated ownership rights, allowing users to buy, sell, or trade the interactable object.

(i) Behavior Scripts: The interactable object may contain scripts that dictate its behavior in response to certain events or interactions.

As can be appreciated, the features of the interactable object that may be received by the VR interface 130 from the virtual world may vary depending on the particulars of the virtual world.

The scanner engine 131 scans the interactable object based on its features to determine if the interactable object is malicious. The scanner engine 131 is configured to block interactable objects that are found to be malicious. The interactable object may be blocked by preventing the user from interacting with the interactable object, including by highlighting the interactable object, disabling interfaces that allow the user to interact with the interactable object, etc.

Because the VR interface 130 may not have the computing resources to properly scan an interactable object, the scanner engine 131 may be configured to scan a limited subset of interactable objects of a virtual world. In one embodiment, the scanner engine 131 does not initiate scanning of an interactable object that has not been rendered by the virtual world and/or the VR interface 130. Limiting the scanning to rendered elements advantageously makes the scanning more manageable.

Also, in one embodiment, the scanner engine does not initiate scanning of an interactable object that is not within a predetermined distance to the user in the virtual world. That is, an interactable object is not scanned unless the interactable object gets in range relative to the user. The range distance may be in terms of a coordinate system employed in the virtual world for identifying the spatial location of users and interactable objects. The range distance for triggering scanning may depend on the type of the interactable object. It is to be noted that an interactable object may be in range of the user even when not in front of or being viewed by the user. In other words, an interactable object may be rendered and within a predetermined range of the user in the virtual world for scanning even when the interactable object is not displayed on the display screen of the VR interface 130.

The scanner engine 131 may locally scan an interactable object by looking for features that are indicative of malicious interactable objects, with the features being represented in signatures, rules, lists, etc. For example, the interactable object may have ownership metadata that may be matched against a blacklist maintained by the scanner engine 131. As another example, the interactable object may have a script that may be matched against signatures of malicious scripts maintained by the scanner engine 131. Yet another example, the VR interface 130 may include a local store of reputation information of a limited number of malicious interactable objects. The scanner engine 131 may consult such local storage to determine the reputation of some interactable objects.

The VR interface 130 may not have the computing resources to locally scan an interactable object, in which case the scanner engine 131 is configured to consult the backend system 140 for the reputation of the interactable object.

For example, the scanner engine 131 may obtain an SRI of an in range and rendered interactable object, and provide the SRI to the backend system 140 (see arrow 103). The backend system 140 uses the SRI to consult the spatial reputation database 141 for the reputation of the interactable object. The backend system 140 uses the SRI to locate the reputation of the interactable object in the spatial reputation database 141 and returns the reputation of the interactable object to the scanner engine 131 (see arrow 104). The scanner engine 131 blocks or allows the interactable object depending on its reputation.

As another example, the scanner engine 131 may obtain a containerized application of the interactable object. The scanner engine 131 may provide the containerized application or an API chain in the containerized application to the backend system 140 (see arrow 103). The backend system 140 may consult the API chain database 142 to obtain a reputation score of an API chain in the containerized application, and provide a reputation of the API chain (and hence of the interactable object) to the scanner engine 131 based on the reputation score (see arrow 104).

A user may check out, from a virtual world, an interactable object that is owned by the user. The interactable object is no longer in the virtual world once it is checked out of the virtual world. The user may check out an interactable object for various reasons, including to adjust features of the interactable object using tools provided by the virtual world, to move the interactable object to another virtual world, etc. In the example of FIG. 1, the user employs a computer 132 to check out (i.e., remove) the interactable object 113-1 from the virtual world 110-1 (see arrow 105). The user may thereafter check in (i.e., bring) the interactable object 113-1 back to the virtual world 110-1 (see arrow 106). In one embodiment, a virtual world does not scan an interactable object being checked in the virtual world if the interactable object is native to the virtual world. In the example of FIG. 1, returning the interactable object 113-1 to the virtual world 110-1 does not initiate scanning of the interactable object 113-1.

The user may also move the interactable object 113-1 to the virtual world 110-2 (see arrow 107). Because the interactable object 113-1 is not native to the virtual world 110-2, the interactable object 113-1 is scanned before being allowed into the virtual world 110-2. A virtual world may take advantage of the scanning service provided by the backend system 140 to scan an interactable object that is entering or is in the virtual world. For example, a virtual world may provide the SRI of an interactable object to the backend system 140 to determine a reputation of the interactable object. The virtual world may also provide a containerized application of the interactable object to the backend system 140. The backend system 140 may identify one or more API chains in the containerized application and consult the API chain database 142 to determine reputation scores of the API chains.

Figure 2:
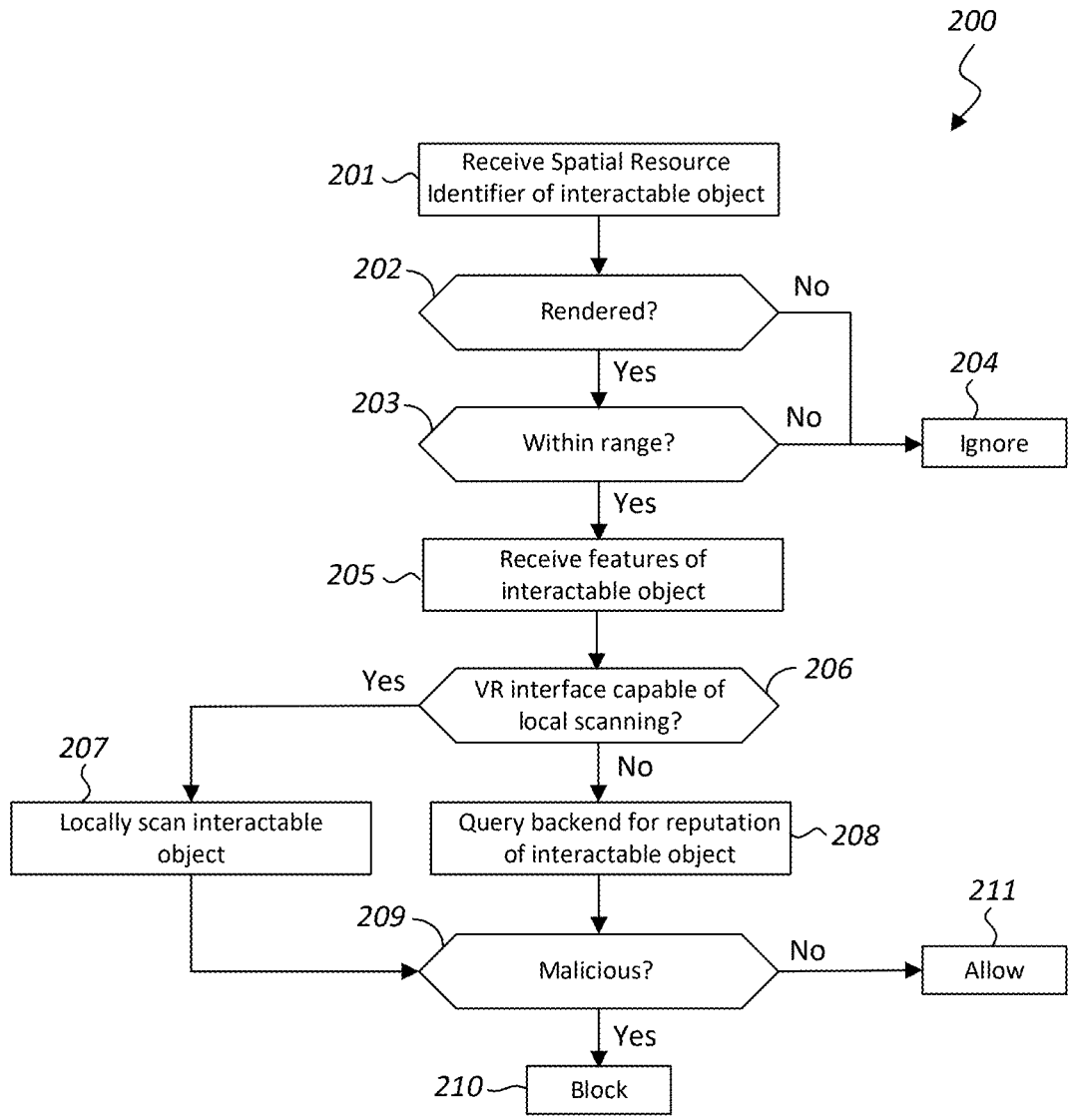
FIG. 2 shows a flow diagram of a method of scanning interactable objects of a virtual world, in accordance with an embodiment of the present invention.

FIG. 2 shows a flow diagram of a method 200 of scanning interactable objects of a virtual world in accordance with an embodiment of the present invention. The method 200 may be performed by the VR interface 130 in conjunction with the backend system 140 as the user accesses a virtual world 110.

In step 201, the VR interface 130 receives an SRI of an interactable object. The VR interface 130 may receive the SRI from the virtual world 110.

In steps 202 and 203, the VR interface 130 does not scan the interactable object until the interactable object has been rendered (step 202 to step 203) and is in range for scanning (step 203 to step 205). That is, the VR interface 130 ignores the interactable object when the interactable object has not been rendered (step 202 to step 204) or is not within a predetermined distance to the user (step 203 to step 204).

In step 205, the VR interface 130 initiates scanning of the interactable object, when the interactable object has been rendered and is in range, by receiving features of the interactable object. The VR interface 130 may receive the features by extracting them from program code or other data of the interactable object provided by the virtual world 110 to the VR interface 130.

In step 206 to step 207, the VR interface 130 locally scans the interactable object when the VR interface 130 is capable of locally scanning the interactable object. For example, the VR interface 130 may scan the interactable object 130 when the VR interface 130 has a local reputation database that indicates a reputation of the interactable object, when the interactable object has a limited number of features, etc.

In step 206 to step 208, the VR interface 130 queries the backend 140 for the reputation of the interactable object when the VR interface 130 is incapable of locally scanning the interactable object. In that case, the VR interface 130 may provide the SRI and other available features of the interactable object to the backend system 140. The backend system 140 may consult the spatial reputation database 141 to determine the reputation of the interactable object. The backend system 140 may also consult the API chain database 142 to determine a reputation score of an API chain of the interactable object. The backend system 140 may deem the interactable object to be malicious when it has a malicious reputation or has an API chain with a reputation score that is below a threshold.

In step 209 to step 210, the interactable object is blocked when the interactable object is found to be malicious either from a local scan (step 207 to step 209) or remote scan (step 208 to step 209) of the interactable object.

In step 209 to step 211, the interactable object is allowed when neither the local scan nor the remote scan indicates that the interactable object is malicious, such as by simply ignoring the interactable object.

FIG. 3 shows a pseudo-code 250 for scanning interactable objects of a virtual world, in accordance with an embodiment of the present invention.

The pseudo-code 250 has a main function (FIG. 3, lines 0001-0018) that scans an in range and rendered element, which in this example is an interactable object identified by an SRI, other interactable objects that are subordinate to the interactable object, other interactable objects triggered by the interactable object, and other interactable objects that support the interactable object (FIG. 3, lines 0020-0028). In the pseudo-code 250, an element is in range when the element is rendered in a viewport (i.e., viewable area even when not displayed) of the VR interface, displayed in the VR interface, hooked by another element that is within a distance D, hooked by a periodic function of another element that is within a distance D, hooked by a function running in the background in the virtual world, etc. (FIG. 3, lines 0030-0038). It is to be noted that being rendered in the viewport of the VR interface, in effect, sets a predetermined range distance as per the constraints of the operating system of the VR interface. The VR interface determines the reputation of the element if the VR interface is capable of doing so (FIG. 3, lines 0006 and 0007); otherwise, the backend system determines the reputation of the element (FIG. 3, lines 0008 and 0009).

Figure 4:
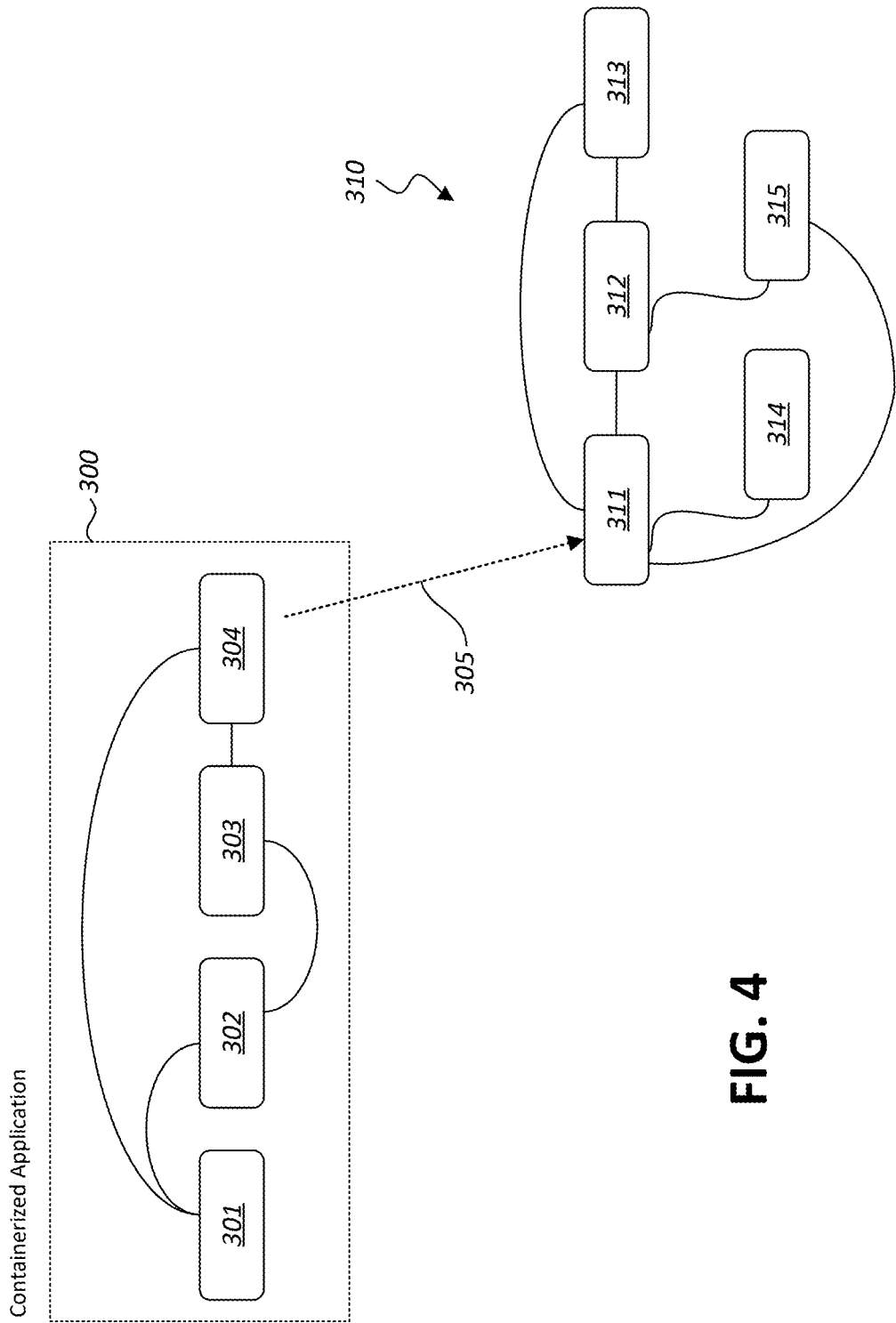
FIG. 4 shows an example containerized application of an interactable object that may be scanned in accordance with an embodiment of the present invention.

An application of an interactable object may be containerized, with the application including an API pipeline that includes an API chain as shown in FIG. 4. In the example of FIG. 4, a containerized application 300 includes, among other program code, an API pipeline comprising APIs 301-304. The API 301 may directly call the API 302, the API 302 may directly call the API 303, which in turn may directly call the API 304. The API 301 may also directly call the API 304.

In the example of FIG. 4, the API 304 directly calls an API chain 310 (see arrow 305), which comprises APIs 311-315. That is, the API 304 may call the API 311, which in turn may call other APIs in the API chain 310 depending on the parameters passed to the API 311. The value returned by the API chain 310, if any, may be passed back to the API 304. In the example of FIG. 4, the API chain 310 is from a third-party provider, which is not necessarily trustworthy.

Figure 5:
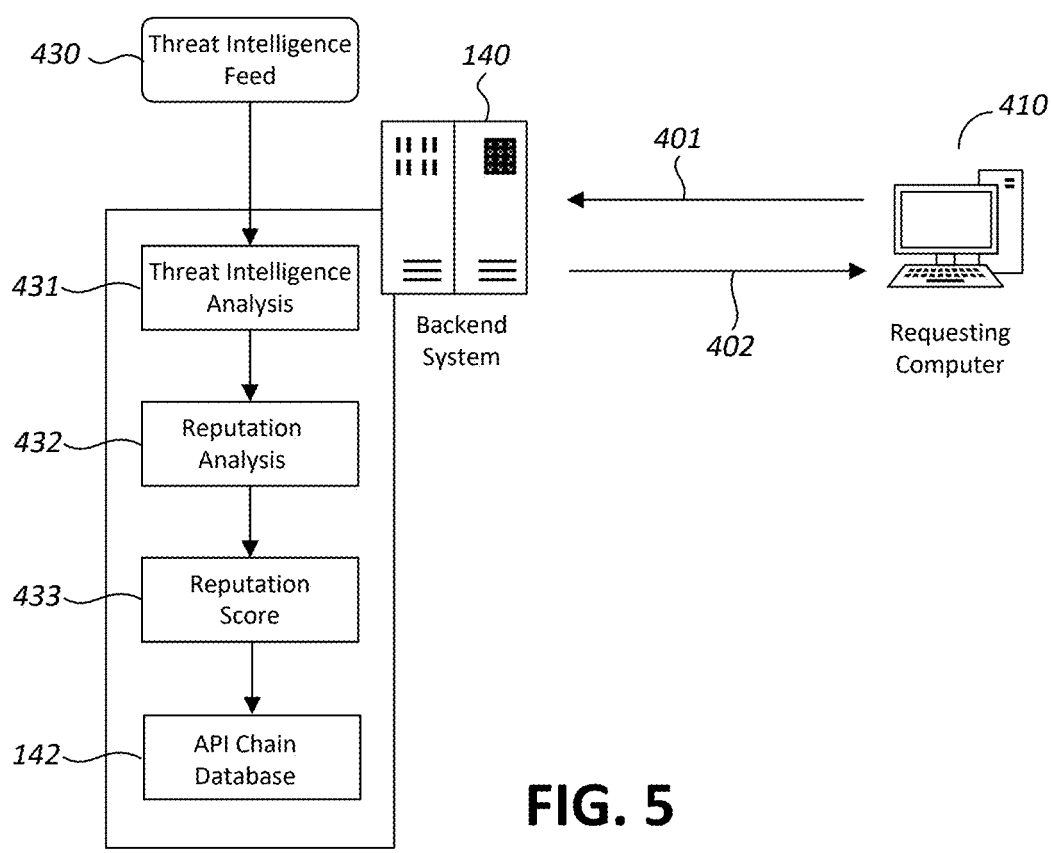
FIG. 5 shows a block diagram of a backend system for processing requests for reputations or reputation scores of application programming interface (API) chains, in accordance with an embodiment of the present invention.

FIG. 5 shows a block diagram of the backend system 140 for processing requests for reputation or reputation score of an API chain, in accordance with an embodiment of the present invention. In the example of FIG. 5, a reputation score of a target (i.e., being evaluated) API chain is generated in the backend system 140 by receiving a threat intelligence feed 430, performing threat intelligence analysis 431 on threat intelligence data from the threat intelligence feed 430 to generate a risk rating of the target API chain, and performing an initial reputation analysis 432 of the target API chain based at least on the risk rating. The risk rating from the threat intelligence analysis 431 and the initial reputation from the reputation analysis 432 may be combined to generate a reputation score 433 of the target API chain, which is stored in the API chain database 142. The threat intelligence analysis 431 and the reputation analysis 432 may be performed by cybersecurity experts on the backend system 140 or other computer system using suitable software, including machine learning, data mining, visualization tools, automation scripts, etc. without detracting from the merits of the present invention.

A requesting computer 410 may request the backend system 140 for a reputation of a target API chain that is in a containerized application of an interactable object (see arrow 401). The requesting computer 410 may be a computer system 112 of a virtual world 110 or other computer system. The requesting computer 410 may provide the target API chain to the backend system 140 by providing the containerized application, by providing only the target API chain, or by some other predetermined arrangement without detracting from the merits of the present invention. The backend system 140 consults the API chain database 142 for the reputation score of the target API chain and returns a result to the requesting computer 410 (see arrow 402).

When the API chain database 142 has a reputation score of the target API chain, the result may be the reputation score or a quantized representation of the reputation score. The quantized representation may indicate that the target API chain has a malicious reputation when the reputation score is below a reputation threshold, or that the target API chain has a normal reputation when the reputation score is equal to or exceeds the reputation threshold. When the API chain database 142 does not have a reputation score of the target API chain, the result may indicate that the target API chain has an unknown reputation.

A reputation score of the target API chain is generated when the target API chain has no reputation score in the API chain database 142. Relevant API data are extracted from the target API chain to initiate generation of the reputation score. The extracted API data may include:
- (a) Information about the provider (i.e., developer, vendor) of the target API chain and any digital signatures/signed certificates.
- (b) All API calls in the target API chain and their interaction with each other.
- (c) API dependencies, on other API calls in the target API chain, or third-party libraries that need to be packaged inside the container for the target API chain to execute correctly.
- (d) API input-output parameters, returns values, access control, error handling, etc.
- (e) API authentication and authorization mechanisms.

The reputation analysis 432 includes using the extracted API data of the target API chain to determine an initial reputation of the target API chain based on, for example, the following:
- (a) The track record of the provider of the target API chain. A long-standing and well-established provider with a proven track record is more likely to offer secure and reliable API chains.
- (b) Community feedback about the target API chain, e.g., research user reviews, developer forums, and social media, to gather feedback about the target API chain. Positive feedback and user experiences can be an indicator of a reputable API chain.
- (c) Published API documentation—check the documentation of the target API chain for clarity, comprehensiveness, and ease of understanding. Transparent providers will have well-organized and detailed documentation about their API chains, including functionalities, limitations, and possible risks.
- (d) Publicly known vulnerabilities—search for records of known vulnerabilities in the target API chain and if the provider has released patches to fix those vulnerabilities. Also check how responsive the provider has been in fixing a vulnerability once it has been disclosed.
- (e) Third-party audits and certifications—assess whether the target API chain provider has undergone third-party audits or has received certifications from reputable organizations. A provider with recognized certifications and positive audit results is more likely to adhere to security best practices and maintain a secure API chain.
- (f) Risk rating from the threat intelligence analysis 431.

The threat intelligence analysis 431 includes receiving threat intelligence data from the threat intelligence feed 430. The threat intelligence feed 430 may include the following threat intelligence data:
- (a) Indicators of Compromise (IoC)—IoCs are evidence that a security incident has occurred or is in progress. Some examples of IoCs include IP addresses, URLs, domain names, file hashes, and email addresses associated with the threat being investigated.
- (b) Tactics, Techniques, and Procedures (TTPs)—TTPs describe the behavior and methods used by threat actors to carry out cyberattacks. This information can help identify patterns in attacks, as well as the fingerprints of groups carrying out the attacks.
- (c) Known Vulnerabilities in software and hardware.
- (d) Threat actor profile—information about specific threat actors or groups, such as their methods, motivations, capabilities, and targeting preferences, can help organizations understand the risks they face.
- (e) Geo-political context—cyber threats often have a geopolitical aspect, such as nation-states and other politically motivated groups engaged in cyber warfare and espionage.

The threat intelligence analysis 431 includes assessing the threat intelligence data to generate a risk rating. The assessment of the received threat intelligence data includes, for example, the following:
- (a) Cross-reference with malicious sources—compare the target API chain provider's domain, Internet protocol (IP) addresses, or other identifying information with known threat intelligence feeds of malicious sources, such as blacklisted IPs, domains, or Uniform Resource Locators (URLs). If a match is found, it may indicate that the target API chain is associated with a potentially malicious provider or has been compromised in the past.
- (b) Security incidents and breaches at the target API chain provider—threat intelligence feeds can provide information about past security incidents or data breaches involving the target API chain provider. By analyzing this data, it can be determined if the provider has a history of security issues, which may impact the trustworthiness of their API chains.
- (c) Analyze malware samples that use the target API chain. Analyzing these samples can help identify patterns or behaviors that may be indicative of potential risks associated with the target API chain.
- (d) Identify relationships with other known malicious entities—search for connections between the target API chain provider and other known malicious entities, such as cybercriminal groups, botnets, or Advanced Persistent Threat (APT) actors. If such connections are found, it raises concerns about the provider's trustworthiness and the security of their API chains.
- (e) Track threats and trends that use the target API chain—track emerging threats and trends related to API chains and their providers. By keeping up to date with the latest threat intelligence, the evolving risk landscape can be better understood. Also, this allows the threat intelligence risk rating of the target API chain to be automatically updated as new data become available.
- (f) Correlating with vulnerability data about API chains/zero-days—the threat intelligence feed includes information about known vulnerabilities in various API chains. By correlating this data with the target API chain provider's history of handling vulnerabilities, insights into their security handling hygiene can be obtained.
- (g) Dark Web monitoring—actively monitor discussions about API chains in the Dark Web and criminal underground forums. Look for information, such as stolen API keys, compromised API endpoints, zero-day vulnerabilities related to API chains, malicious API chains, attacker TTPs, threat actor discussions about API chains, insider threat type of messages, API related breaches, security research and vulnerability disclosure discussions around API chains. By monitoring these aspects on the Dark Web, potential threats and vulnerabilities related to API chains may be identified and mitigated before they can be exploited by attackers.

The risk rating from the threat intelligence analysis 431 and the initial reputation from the reputation analysis 432 may be combined to generate the reputation score of the target API chain. This reputation score is a composite of the severity, criticality, timeliness, and confidence in the risk rating and the initial reputation. For example, the risk rating and initial reputation may be weighted and adjusted by a confidence factor to generate the reputation score of the API chain.

Figure 6:
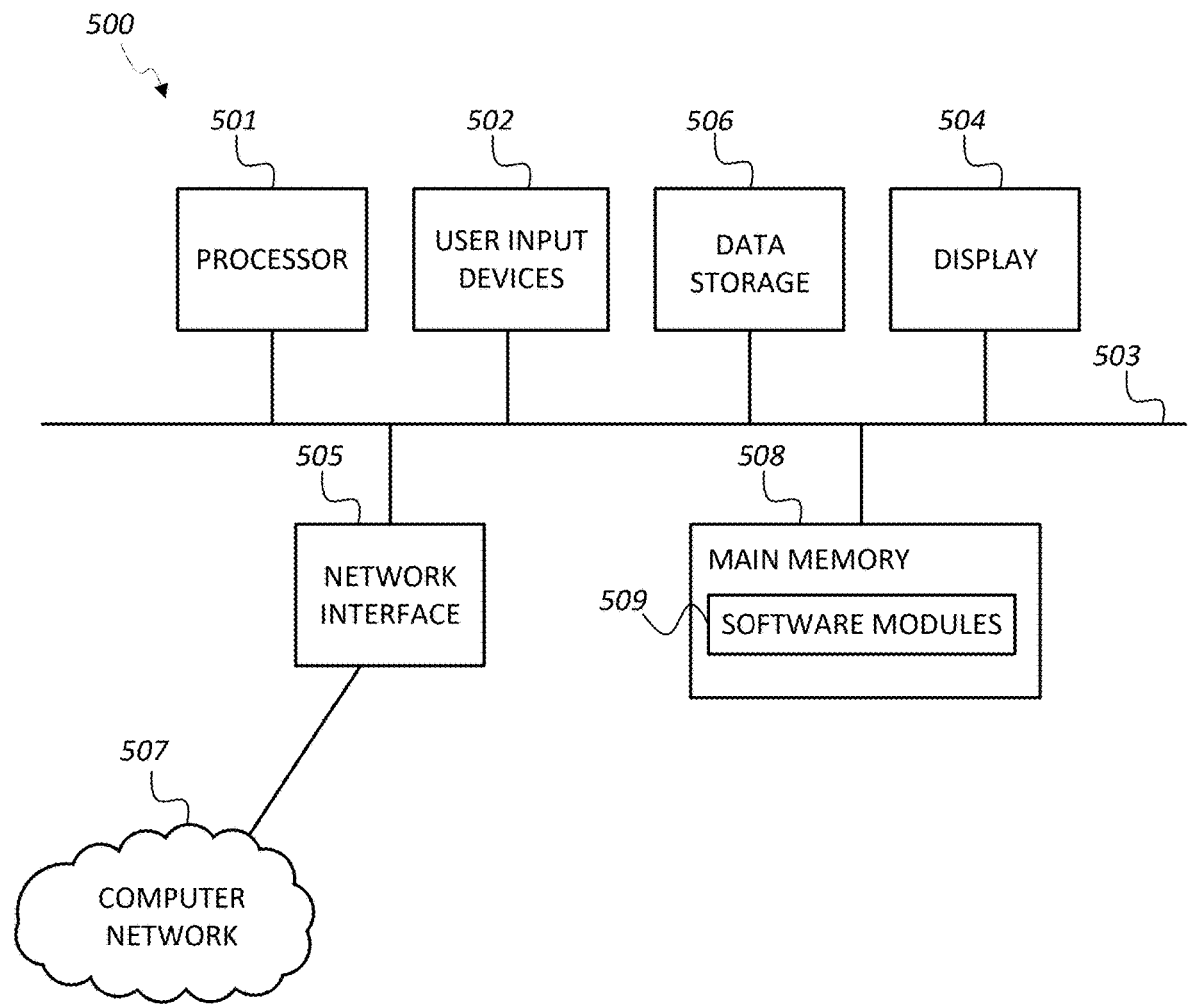
FIG. 6 shows a block diagram of a computer system that may be employed with embodiments of the present invention.

FIG. 6 shows a block diagram of a computer system 500 that may be employed with embodiments of the present invention. The computer system 500 may be employed as a VR interface, a backend system, computing infrastructure of a virtual world, or other computer described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502, one or more data storage devices 506, a display screen 504, a computer network interface 505, and a main memory 508. The computer network interface 505 may be coupled to a computer network 507, which in this example includes the public Internet.

The computer system 500 is a particular machine as programmed with one or more software modules 509, comprising instructions stored non-transitory in the main memory 508 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 509.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of scanning interactable objects of a virtual world to determine if the interactable objects are malicious, the method comprising:
   receiving, in a virtual reality (VR) headset, an identifier of an interactable object of a plurality of interactable objects of a virtual world, the identifier identifying the interactable object in the virtual world;
   determining if data for displaying the interactable object have been received in the VR headset;
   determining if the interactable object is within a predetermined distance to a user in the virtual world, wherein the user employs the VR headset to access the virtual world;
   providing the identifier from the VR headset to a backend system responsive to the data for displaying the interactable object having been received in the VR headset and responsive to the interactable object being within the predetermined distance to the user in the virtual world;
   receiving a reputation of the interactable object from the backend system; and
   blocking or allowing the interactable object depending on the reputation of the interactable object,
   wherein the identifier is provided by the VR headset to the backend system responsive to the VR headset being incapable of locally scanning the interactable object to determine if the interactable object is malicious.

2. The method of claim 1, further comprising:
   in the backend system, consulting a reputation database for the reputation of the interactable object.

3. The method of claim 1, further comprising:
   blocking the interactable object in response to the reputation of the interactable object indicating that the interactable object is malicious.

4. A system for scanning interactable objects of a virtual world to determine if the interactable objects are malicious, the system comprising:
   a virtual reality (VR) headset that is employed by a user to access a virtual world, the VR headset comprising at least one processor and a memory, the memory of the VR headset storing instructions that when executed by the at least one processor of the VR headset cause the VR headset to:
   receive an identifier of an interactable object of the virtual world;
   determine if the interactable object has been rendered;
   determine if the interactable object is in range of the user in the virtual world;
   provide the identifier of the interactable object to a backend system in response to the interactable object having been rendered, the interactable object is in range of the user in the virtual world, and the VR headset being incapable of locally scanning the interactable object;
   receive a reputation of the interactable object from the backend system; and
   allow or block the interactable object depending on the reputation of the interactable object; and
   the backend system comprising at least one processor and a memory, the memory of the backend system storing instructions that when executed by the at least one processor of the backend system cause the backend system to:
   receive the identifier of the interactable object;
   consult a reputation database to obtain the reputation of the interactable object; and
   provide the reputation of the interactable object to the VR headset.

5. The system of claim 4, wherein the instructions stored in the memory of the VR headset, when executed by the at least one processor of the VR headset, cause the VR headset to:
   block the interactable object in response to the reputation of the interactable object indicating that the interactable object is malicious.

6. A virtual reality (VR) interface comprising at least one processor and a memory, the memory storing instructions that when executed by the at least one processor cause the VR interface to:
   receive an identifier of an interactable object of a plurality of interactable objects of a virtual world, the identifier identifying the interactable object in the virtual world;

determine a distance between a user of the VR interface and the interactable object in the virtual world;

in response to the interactable object being within a predetermined distance to the user in the virtual world and has been rendered, determine if the VR interface is capable of locally scanning the interactable object in the VR interface to determine a reputation of the interactable object;

provide the identifier of the interactable object to a backend system that is outside the virtual world in response to the VR interface being incapable of locally scanning the interactable object;

receive the reputation of the interactable object from the backend system; and block or allow the interactable object based on the reputation of the interactable object.

7. The VR interface of claim 6 wherein the backend system comprises at least one processor that executes instructions to cause the backend system to consult a reputation database using the identifier of the interactable object to determine the reputation of the interactable object.

8. The VR interface of claim 6, wherein the interactable object is blocked in response to the reputation of the interactable object indicating that the interactable object is malicious.

9. The VR interface of claim 6, wherein VR interface is a VR headset.

* * * * *